`US007327725B2`

United States Patent
Schriel et al.

(10) Patent No.: US 7,327,725 B2
(45) Date of Patent: Feb. 5, 2008

(54) METHOD AND APPARATUS CAPABLE OF TRANSFERRING VERY HIGH DATA RATES ACROSS A MIDPLANE OR BACKPLANE

(75) Inventors: James Micheal Schriel, Nepean (CA); Mark R. Megarity, Dunrobin (CA)

(73) Assignee: Alcatel Canada Inc., Ottawa, Ontario (CA)

( * ) Notice: Subject to any disclaimer, the term of this patent is extended or adjusted under 35 U.S.C. 154(b) by 1044 days.

(21) Appl. No.: 10/304,797

(22) Filed: Nov. 27, 2002

(65) Prior Publication Data

US 2004/0100946 A1    May 27, 2004

(51) Int. Cl.
*H04L 12/50* (2006.01)
*H04J 3/24* (2006.01)
*H04J 3/06* (2006.01)

(52) U.S. Cl. .................. 370/366; 370/474; 370/503
(58) Field of Classification Search .......... 370/395.1, 370/366, 365, 364, 451, 352, 472, 473, 474, 370/476, 477, 400, 419, 420, 249
See application file for complete search history.

(56) References Cited

U.S. PATENT DOCUMENTS

| | | | |
|---|---|---|---|
| 6,317,433 B1 * | 11/2001 | Galand et al. .......... | 370/395.2 |
| 6,934,301 B2 * | 8/2005 | Jordan .................... | 370/466 |
| 7,006,489 B2 * | 2/2006 | Li et al. .................. | 370/466 |
| 7,079,528 B2 * | 7/2006 | Ziegler et al. .......... | 370/352 |
| 7,130,276 B2 * | 10/2006 | Chen et al. .............. | 370/249 |
| 7,142,564 B1 * | 11/2006 | Parruck et al. .......... | 370/474 |

FOREIGN PATENT DOCUMENTS

| | | | |
|---|---|---|---|
| EP | 1024632 A | 8/2000 |
| EP | 1315397 A | 5/2003 |
| WO | WO 96/17489 A | 6/1996 |
| WO | WO 01/20947 A | 3/2001 |

* cited by examiner

*Primary Examiner*—Hanh Nguyen
(74) *Attorney, Agent, or Firm*—Jim Zegeer

(57) ABSTRACT

A method and apparatus of communicating data packets across the midplane of an electronic system in which the packets are partitioned into segments of a predetermined size and then serialized to a predetermined width. The serialized packets are transmitted, in phase staggered segments, across the midplane on a respective channel, received into receiving end and the serialized segments that have traversed the midplane, are deserialized and reassembled into the original data packet.

8 Claims, 3 Drawing Sheets

METHOD AND APPARATUS CAPABLE OF TRANSFERRING VERY HIGH DATA RATES ACROSS A MIDPLANE OR BACKPLANE

BACKGROUND OF THE INVENTION

This invention relates to a bus capable of transferring variable length packets (e.g. for POS) at a 10 Gbps rate between two separate cards across a midplane or backplane.

The midplane or backplane (midplane/backplane) has a limited number of physical pins available and signals must pass through two connectors, which potentially could introduce signal integrity issues for high-speed signals.

There is a width vs. speed tradeoff, wherein a slower bus rate is easier and more reliable to implement however it must also be wider, which can be inefficient for short packets.

SQULB (prior art) is a sequenced utopia-3 like bus designed for asynchronous transfer mode (ATM) applications, i.e. fixed sized (56-byte) cells, and as such is not capable of handling variable length packets.

In order to modify SQULB to handle variable length packets, the bus must be made four times wider (four-bytes to sixteen-bytes). This solution is not feasible for the following reasons:

1. The limited number of pins available across the midplane/backplane. There is currently no offering of serializer/deserializer (SERDES) devices capable of handling this bus width. Separate SERDES devices would make it difficult to receive the packet data in the proper order and with minimal signal skew.
2. A sixteen-byte wide bus implies that a single packet could contain up to fifteen empty bytes transferred during the end of packet. This transmission model would be very inefficient and would require a large increase in the operating frequency of the physical bus to maintain a 10 Gbps rate.

THE PRESENT INVENTION

The present invention is directed to a method and apparatus for partitioning packets into segments of a predetermined size (e.g. 64 bytes), serializing the segments, and transmitting the segments over a plurality of channels (for example, four) that have a staggered phase relationship to one another, and wherein the phase difference between adjacent channels (actually, adjacent segments in the sequence of segments that form the packet) is more than the maximum latency that can occur in any one channel, thereby maintaining the ordering of the serialized packet segments, Preferably, there are 64-byte segments divided into four channels and staggering is 2 times maximum latency. While the invention is particularly applicable to variable length packets, the invention can also be used for fixed-length cells as well as variable length packets.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
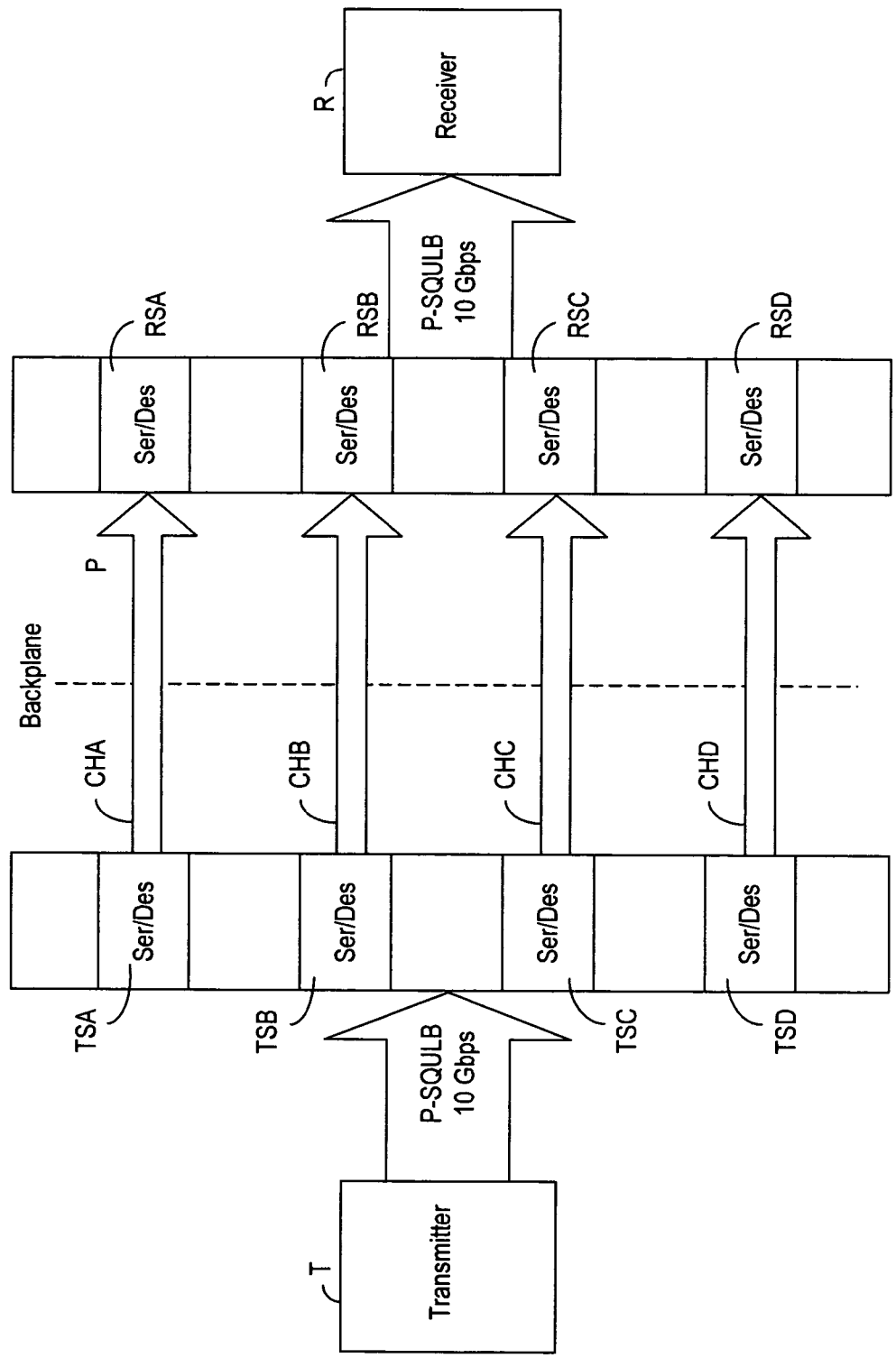
FIG. 1 is a block diagram illustrating the packets divided into 64-byte segments for transmitting over four channels are staggered in their phase relationship to one another.

Referring to FIG. 1, packets from transmitter T are divided into 64-byte segments for transmission over four channels CHA, CHB, CHC and CHD that are staggered in their phase relationship to one another. A first array or set of SERDES (serializer/deserializer) devices TSA, TSB, TSC and TSD at the transmitter T in each channel is used to serialize the data and control for transmission across the midplane/backplane P and a second array or set of SERDES devices RSA, RSB, RSC and RSD are used at the receiver R in each channel to deserialize the data. These SERDES devices allow data and control to be passed across the midplane/backplane in a compressed manner and thus reduce the large variable amount of latency for a complete packet transfer. Furthermore, by staggering the phase relationship of the channels, the maximum latency that can occur in any one channel is accommodated and therefore the ordering of packet segments is maintained. For example, in the embodiment implemented in FIG. 1, the channels are staggered by 40 ns and the maximum latency per channel is 20 ns.

The invention has two basic aspects: the topology of FIG. 1 and a bus protocol that runs on that topology to provide the required bandwidth of 10 Gbps for variable length packets.

Figure 2:
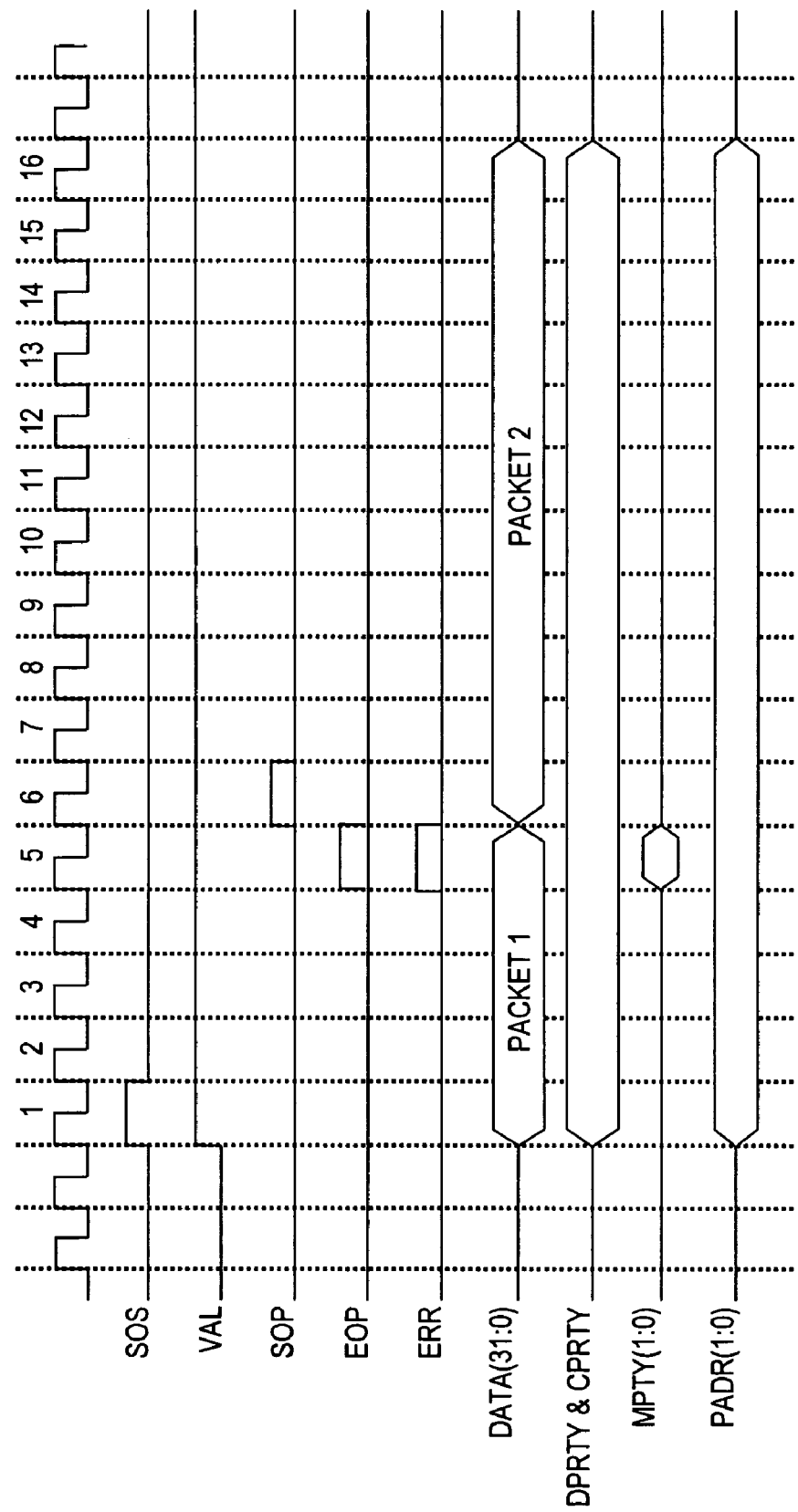
FIG. 2 is a timing chart showing a single channel bus timing of a given example.

With reference to FIG. 2, the bus protocol will now be briefly described:

Egress Data Path Signal Definitions

The following describes a single channel and what is described is applicable for all four channels and can easily be extended to the complete bus.

Each channel includes a plurality of core data path signals, a 32-bit wide data bus with eleven-bits of out-of-band control, and a number of non-core data path signals, which may be used to transfer additional information.

Packets are broken apart into segments, 64-bytes of data, and transmitted 32-bits per cycle over 16 clock cycles. Packets that are greater than 64 bytes are required to be transmitted over more than one channel.

When data is available for transmission, a Start of Segment (SOS) is raised for one clock cycle concurrent with the first word of the transfer.

When a new packet is being transmitted, a Start of Packet (SOP) signal is raised for one clock cycle concurrent with the first word of the packet. Similarly, when the last word of a packet is being transmitted, an End of a Packet (EOP) signal is raised for one clock cycle concurrently with the last word. The Empty (MPTY) signals indicate how many bytes of the current word are valid. Since the bus is a word-wide (i.e. 32-bits will be transferred each clock cycle) up to three bytes of PAD may be present on a transfer. The MPTY signals are only valid when an EOP occurs. If the packet happens contain an error, then the Error (ERR) signal becomes active while EOP is active.

During the complete data transfer, the Valid (VAL) signal is active. The parity across this interface should always be valid for both the data path (DPRTY) signal and the control path (CPRTY) signal.

If there is no data to be transferred, idle cycles will occur on the bus. For an idle cycle, the data bus and all the control signals (except parity) will be driven low. The parity will remain valid at all times.

Summarizing:
 1. Data packets are divided into 64-byte segments,
 2. This interface has parity protection for all data and control signals (DPRTY and CPRTY),
 3. Each segment is serialized to four bytes wide [Data (31:0)] and each segment is tagged with a set of out-of-band control signals, as shown in FIG. 2. The associated control signals consist of start and end of packet indications (SOP and EOP), error indication (ERR), and the number of empty bytes transmitted during the end of packet condition. This information is then used by the receiver to properly assemble the packet.

Figure 3:
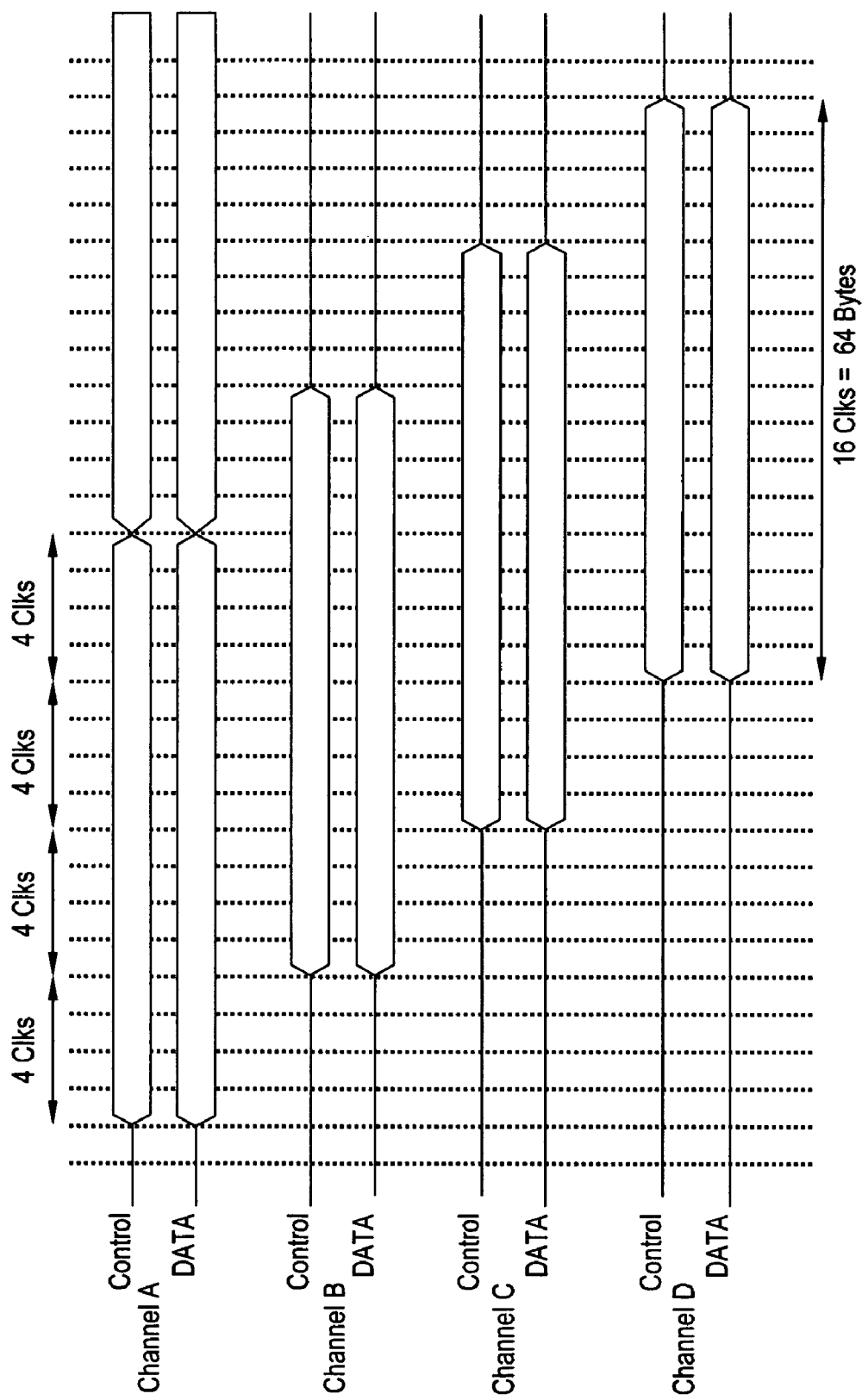
FIG. 3 illustrates the staggering performed by the transmitting device.

FIG. 3 illustrates the staggering performed by the transmitting device T.

The advantages of the invention, in general, and over the closest prior art solution include:
 1. variable length packets can be transmitted very efficiently at a low bus frequency while maintaining a bandwidth of 10 Gbps. Furthermore, in the present implementation, the segmentation of packets into 64-byte segments means that ATM cells can also be transmitted very efficiently over the bus.
 2. The described bus topology is easily amenable to quad OC48.
 3. Since the bus is divided into segments transmitted four-bytes at a time, there is only a need for a maximum of three empty bytes per packet. This scheme makes the bus more efficient and allows it to operate at a slower frequency while still achieving 10 Gbps rates.

The invention is directed to the method and apparatus of partitioning packets into segments of predetermined size (for example, 64-bytes), serializing the segments, and transmitting them over a plurality of channels (for example, four) that have a staggered phase relationship to one another, and wherein the phase difference between adjacent channels (actually, adjacent segments in a sequence of segments that form the packet) and more than the maximum latency that can occur in any one channel, thereby maintaining the order of the serialized packet segments. The invention is not limited to variable-length packets as the invention can be used for both fixed-length cells and variable-length packets.

This invention addresses an obstacle and solves the problem that will be encountered by any efforts to pass variable-length packet data between separate cards.

While the invention has been described in relation to preferred embodiments of the invention, it will be appreciated that other embodiments, adaptations and modifications of the invention will be apparent to those skilled in the art.

What is claimed is:

1. A method of communicating data packets across a midplane or a backplane of an electronic system, comprising the steps of:
 a) forming a plurality of channels through said midplane or backplane,
 b) partitioning each data packet into segments of a predetermined size;
 c) serializing each segment to a predetermined width;
 d) transmitting each serialized segment across said midplane or backplane on a respective channel, including the step of delaying the transmission of a segment in one channel from that of a channel carrying a next sequential segment of the data packet so that the segments of a packet on the respective channel are staggered in time relative to each other,
 e) receiving, from said respective channels, serialized segments that have traversed the midplane or backplane;
 f) deserializing the received serialized segments; and
 g) re-assembling the deserialized segments into the data packet.

2. The method defined in claim 1 wherein step d) further includes tagging the packet with the out-of-band control and error correction/detection signals.

3. An electronic system having a digital data transmitter side apparatus for transmitting digital data packets of variable length between two separate points across a midplane or a backplane to a digital data receiver side apparatus, comprising:
 at said digital data transmitter side,
 said transmitter partitioning each digital data packet into segments of a: predetermined size,
 an array of serializers connected to said transmitter side for serializing each segment into a predetermined width, each serializer being connected to a separate pathway through said midplane or backplane, at said digital data receiver side,
 an array of deserializers corresponding in number to the number of serializers on said transmitter side of said midplane or backplane and corresponding thereto, respectively, for receiving from said respective channels the serialized segments of data traversing said midplane or backplane and
 a receiver for reassembling the deserialized segments into the data packet and wherein in said partitioning of packets into a predetermined size and serializing of segments thereof and transmitting said segments over a plurality of channels, said channels have a staggered phase relationship to one another wherein the phase difference between adjacent channels is more than the maximum latency in any one channel thereby maintaining the ordering of the serialized packet segments.

4. The apparatus defined in claim 3 wherein said data segments are in 64-byte segments and the number of channels in said midplane are four and staggering is two times the maximum latency.

5. An electronic system having a digital data transmitter side apparatus for transmitting digital data packets of variable length between two separate points across a midplane or a backplane to a digital data receiver side apparatus, comprising:
 at said digital data transmitter side,
 said transmitter partitioning each digital data packet into segments of a predetermined size, the transmission of a segment of a packet in a respective channel is delayed from transmission of a next sequential segment of the packet in another channel,
 an array of serializers connected to said transmitter side for serializing each segment into a predetermined width, each serializer being connected to a separate pathway through said midplane or backplane, at said digital data receiver side,
 an array of deserializers corresponding in number to the number of serializers on said transmitter side of said midplane or backplane and corresponding thereto, respectively, for receiving from said respective channels the serialized segments of data traversing said midplane or backplane and
 a receiver for reassembling the deserialized segments into the data packet.

6. The apparatus defined in claim 5 including means for tagging the packets with an out-of-band control and error correction/detection signals.

7. A communication system having a digital data transmitter side apparatus for transmitting digital data packets of variable length between two separate cards across a midplane or a backplane to a digital data receiver side apparatus, said transmitter side apparatus including:

said transmitter partitioning and time staggering each digital data packet into segments of a predetermined size and an array of serializers connected to said transmitter side for serializing each segment into a predetermined width, each serializer being connected to a separate pathway through said midplane or backplane.

8. In a communication system having a digital data transmitter side for transmitting digital data packets of variable length formatted as time staggered segments of a predetermined size between two separate cards across a midplane or a backplane over multiple channels, a receiver side apparatus comprising:

an array of deserializers corresponding in number to the number of said channels, each for receiving from respective channels serialized segments of data that traverse said midplane or said backplane, and reassembling the segments into data packets.

* * * * *